(No Model.)
J. COLEMAN.
NUT LOCK.
No. 473,613.  Patented Apr. 26, 1892.
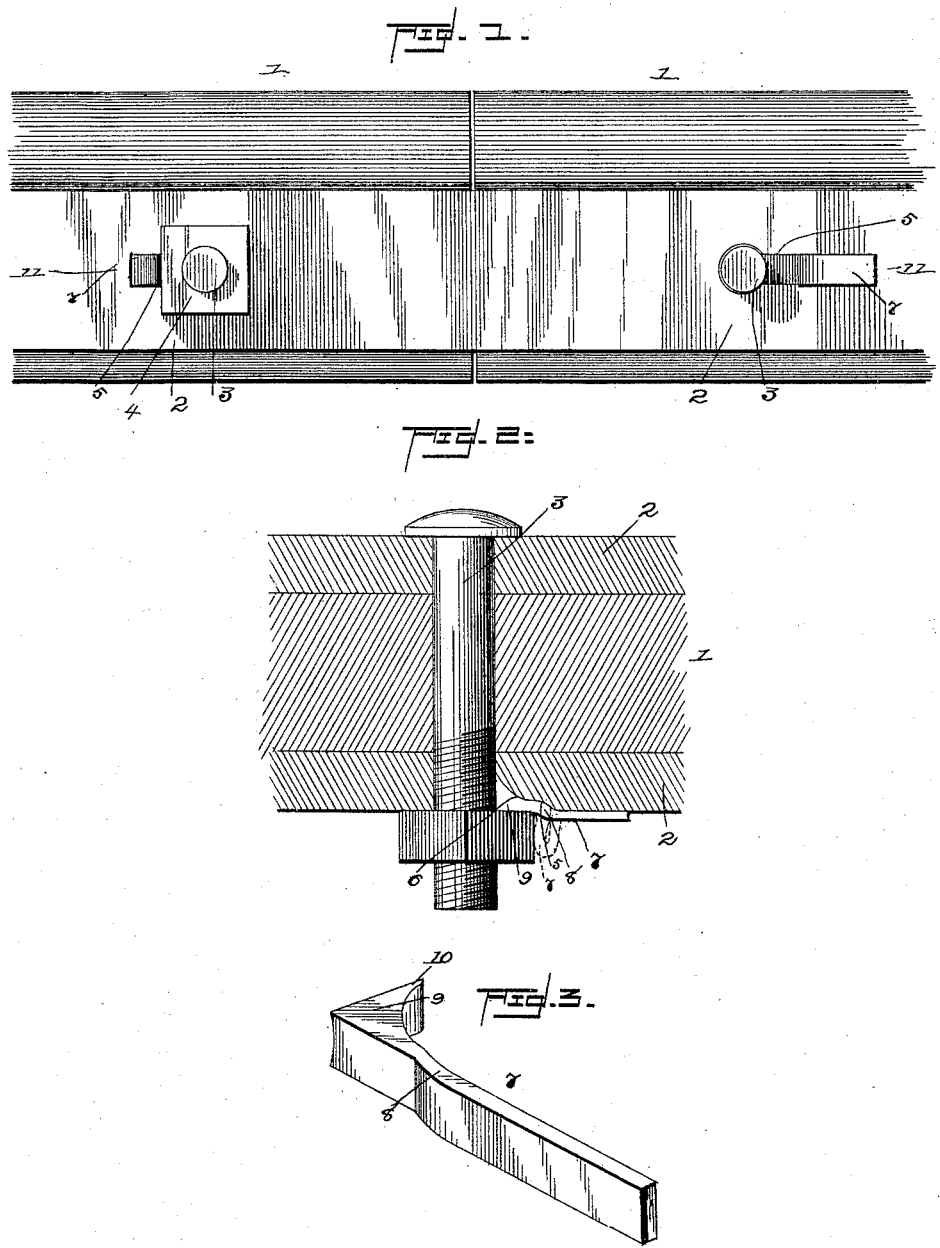
Witnesses:  Inventor
O. S. Duvall Jr.  John Coleman.
W. S. Duvall.  By his Attorneys,
  C. A. Snow & Co.

UNITED STATES PATENT OFFICE.

JOHN COLEMAN, OF LYNCHBURG, VIRGINIA, ASSIGNOR OF THREE-FOURTHS TO J. L. BECK, WM. A. CARPENTER, AND EDWARD P. LEE, OF SAME PLACE, AND FRANK HUGER, OF ROANOKE, VIRGINIA.

NUT-LOCK.

SPECIFICATION forming part of Letters Patent No. 473,613, dated April 26, 1892.

Application filed December 12, 1890. Serial No. 374,471. (No model.)

*To all whom it may concern:*

Be it known that I, JOHN COLEMAN, a citizen of the United States, residing at Lynchburg, in the county of Campbell and State of Virginia, have invented a new and useful Nut-Lock, of which the following is a specification.

This invention has relation to improvements in nut-locks; and the objects in view are to provide a lock for nuts, which lock shall be of cheap and simple construction, easily applied, and adapted to be applied to the nuts and bolts of the present day in such a manner as not to injure the threads of the bolt or nut, and which will be safe and secure against any accidental displacement.

Other objects and advantages of the invention will hereinafter appear, and the novel features thereof will be particularly pointed out in the claims.

Referring to the drawings, Figure 1 is a side elevation of a portion of a railway-joint the nuts of the bolts of which are locked in accordance with my invention and the nut of one of the bolts being removed. Fig. 2 is a horizontal section through one of the bolts and locking-key. Fig. 3 is a detail in perspective of the locking-key.

Like numerals of reference indicate like parts in all the figures of the drawings.

1 designates the rail-sections, the ends of which abut in the usual manner and are overlapped by the opposite fish-plates 2, through which and the webs of the sections are passed the usual bolts 3, having the nuts 4 for binding them in position and the several parts together. At one side of each of the bolt-openings of the outer fish-plate there is formed a recess 5, which radiates from the bolt-opening and is provided with an inclined bottom, or, in other words, gradually deepens toward the opening and grows shallow toward the outer end of the recess, at which point it terminates in an abrupt shoulder 6.

7 designates the key, which may be formed of steel, malleable iron, &c., and is of oblong shape in plan and flat, being provided with a transverse bend or shoulder 8 to engage the shoulder 6 of the recess and terminating at its inner end in an inwardly-disposed inclined tooth 9, designed to fit the deepest portion of the recess, said tooth having its outer face curved to agree with the bolt and terminating in a sharp driving-edge 10.

In practicing my invention the bolt is first placed in position, after which the key is inserted in its seat and the nut screwed down upon the bolt and key and serves to prevent the latter from being withdrawn. When sufficiently tightened, a few taps of a hammer delivered upon the outer end of the key serves to double the same upon itself at its bent portion or shoulder 8 and form a lateral extension, which lies alongside one of the faces of the nut and prevents any possible retrograding of the same.

If desired, as before stated, the tooth of the locking-key may be made sharp to form a driving-edge, and when thus formed is especially adapted to be driven into a self-forming seat formed in a wood beam or the like. When, however, the seats are formed in metal, as in the present instance, an actual driving-edge need not be provided, but the two simply tapered, as shown.

Having described my invention, what I claim is—

1. The herein-described nut-lock, consisting of a flat shank terminating at one end in a tapered driving-head disposed at a right angle to the shank, the outer face of which is concaved to fit a bolt, substantially as specified.

2. The herein-described nut-lock, consisting of a flat shank terminating at one end in a flat head having a driving end at one side thereof and having its inner face concaved to fit a bolt, the shank of the device having a transverse kink at one side of the head, substantially as specified.

In testimony that I claim the foregoing as my own I have hereto affixed my signature in presence of two witnesses.

JOHN COLEMAN.

Witnesses:
CHAS. B. ANDERSON,
R. S. McCLUER.